UNITED STATES PATENT OFFICE.

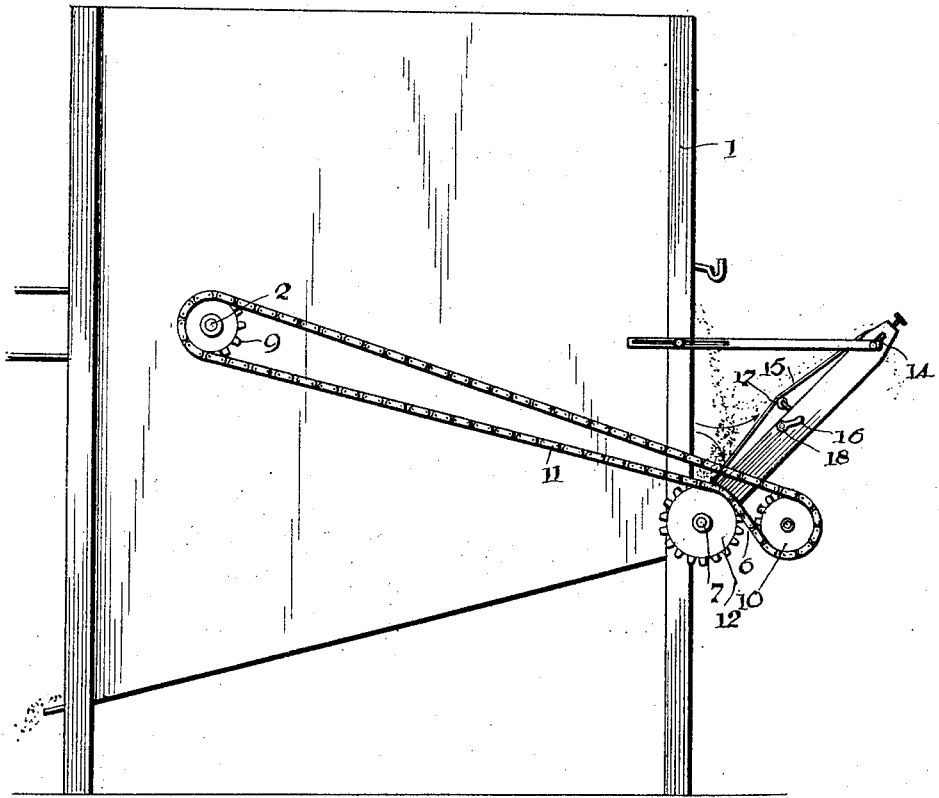
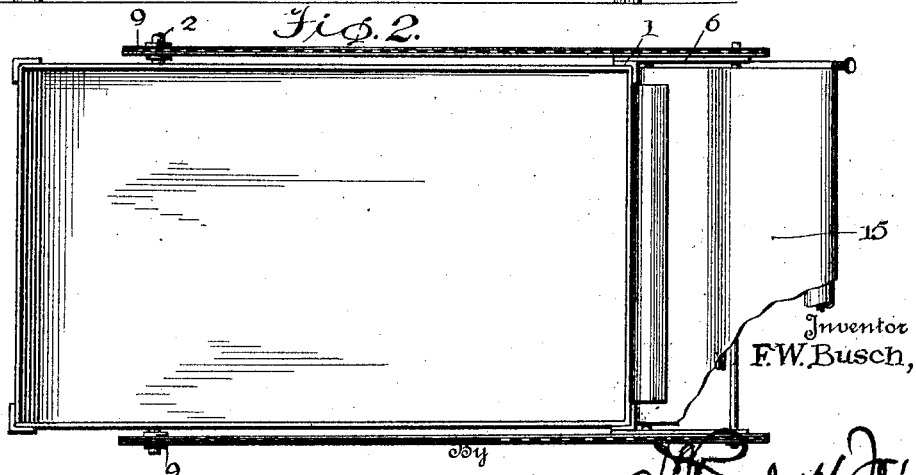

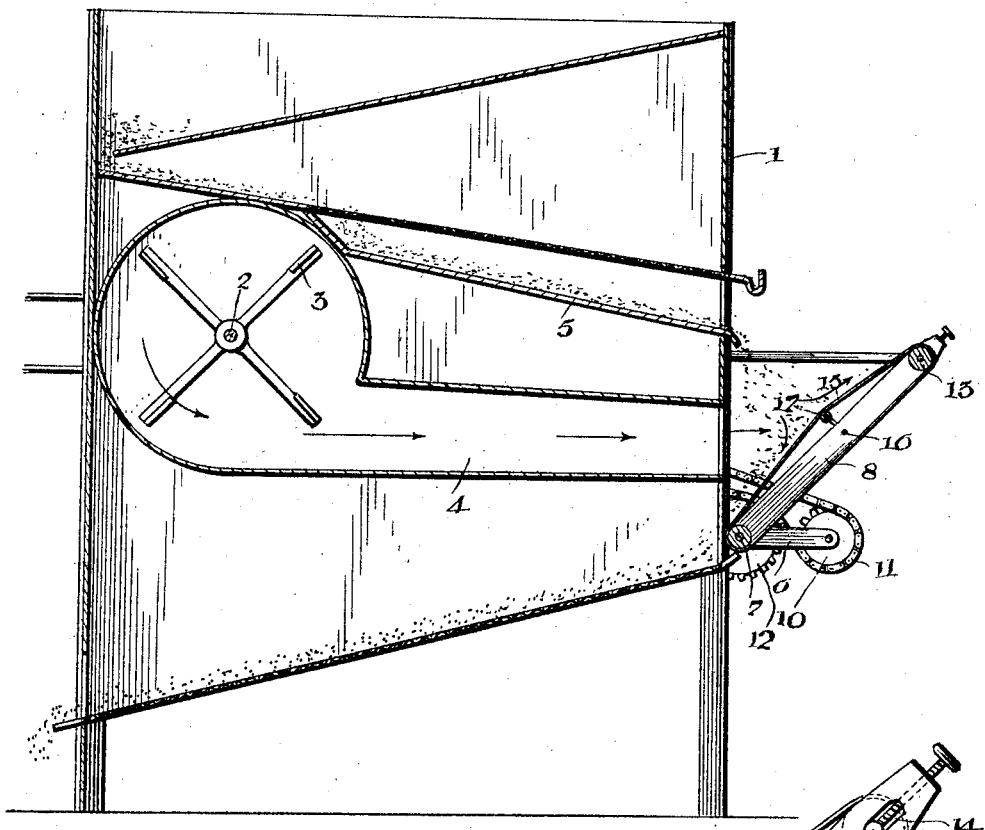
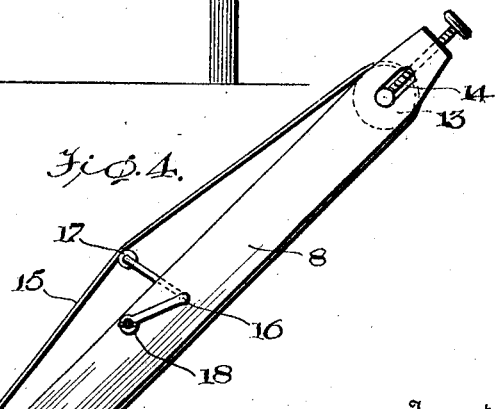
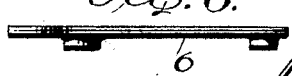

FERDINAND W. BUSCH, OF BERLIN, NORTH DAKOTA.

WILD-OATS SEPARATOR.

1,401,039.

Specification of Letters Patent.  Patented Dec. 20, 1921.

Application filed June 23, 1920. Serial No. 391,044.

*To all whom it may concern:*

Be it known that I, FERDINAND W. BUSCH, a citizen of the United States, residing at Berlin, in the county of La Moure and State of North Dakota, have invented certain new and useful Improvements in Wild-Oats Separators; and I do hereby declare the following to be a full, clear, and exact description of the invention, such as will enable others skilled in the art to which it appertains to make and use the same.

This invention relates to wild oats separators and it consists in the novel features hereinafter described and claimed.

An object of the invention is to provide an attachment adapted to be applied to a fanning mill and used for the purpose of separating wild oats from wheat or other grain as the same passes through the mill.

A further object of the invention is to improve the form of separator whereby the same may be rendered sensitive in order that it may effect the separation from the wheat of other seed or grains which are of different specific gravity or which are different in character as to the condition of inclosing husk or pericarp.

With the above objects in view the wild oats separator comprises a frame adapted to be pivotally connected with the frame of a fanning mill at the end thereof where the blast of air is discharged. A belt is mounted for orbital movement upon the frame of the separator and means are provided for moving the belt from the fan shaft of the mill. The frame may be positioned at various angles with relation to a horizontal and the belt is adapted to receive against its upper run the mixed seed and the blast of air is discharged through the seed whereby the wild oats and seed of less specific gravity are carried up by the belt while the grain or wheat slides down along the upper run of the belt and is recovered in a usual manner. Means are provided for disposing the end portions of the upper run of the belt at an angle with relation to each other and the mixed seed is deposited upon the belt approximately at the apex of the said angle. The blast of air is discharged into the seed at a point immediately below the apex of the angle.

In the accompanying drawings:—

Figure 1 is a side elevation of a fanning mill with the wild oats separator applied thereto, Fig. 2 is a top plan view of the same, Fig. 3 is a sectional view taken in a vertical plane extending centrally and longitudinally through the fanning mill.

Fig. 4 is a detail view in side elevation of the separator, and

Figs. 5 and 6 are detail views in side and edge elevation, respectively, of one of the separator brackets.

As illustrated in the accompanying drawings the frame of the fanning mill is indicated at 1, the fan shaft at 2 having fan blades 3 mounted thereon in a usual manner. Any suitable means may be provided for rotating the shaft 2. The fan casing is provided with a trunk 4 which is adapted to discharge the blast of air from the fan blades when the fan is in operation. A raddle 5 of usual structure is mounted upon the upper portion of the frame 1 and the mixed grain and seed are adapted to gravitate down along the raddle 5 in the usual manner.

The wild oats separator comprises brackets 6 which are applied to the frame 1 at points below the outlet end of the trunk 4. A shaft 7 is journaled for rotation in the bracket 6 and a frame 8 is pivotally mounted upon the shaft 7. The frame 8 may be disposed at various angles with relation to a horizontal. A sprocket wheel 9 is fixed to the shaft 3 and a sprocket wheel 10 is journaled upon one of the brackets 6. A sprocket chain 11 is trained around the sprocket wheels 9 and 10 and one of the runs of the chain 11 engages the teeth of a wheel 12 which is fixed to the shaft 7. Consequently as the fan shaft 2 is rotated, rotary movement is transmitted to the shaft 7. A roller 13 is journaled at the outer portion of the frame 8 and its shaft is carried in boxes 14 which are adjustably mounted in the outer portion of the frame 8. A belt 15 is trained around the roller 13 and the intermediate portion of the shaft 7 and its runs move along the frame 8 as the shaft 7 rotates as hereinbefore described.

A crank shaft 16 is journaled in the side members of the frame 8 at points between the ends thereof and the crank of the shaft 13 is disposed between the upper and lower runs of the belt 15. A roller 17 is loosely journaled upon the crank of the shaft 16 and is adapted to bear against the under surface of the upper run of the belt 15. The shaft 16 is provided at one end with a handle 18 which may be used for turning the shaft 16 in its bearing upon the frame 8.

When the shaft 16 is turned the roller 17 engages the under surface of the upper run of the belt 15 and distorts the said run of the belt out of a straight line so that its end portions are disposed at an angle with relation to each other and the apex of the angle is located at a point above the discharge outlet of the trunk 4 and below the lower edge of the raddle 5. Therefore, as the mixed grain moves down over the raddle and comes in contact with the blast of air which is discharged from the trunk 4, the air passes through the grain and forces the lighter seed, as for instance wild oats, up and over the angle between the end portions of the upper run of the belt 15 while the grain, which is of greater specific gravity, as for instance, wheat, moves down along the lower portion of the upper run of the belt 15 and passes out through the lower portion of the fanning mill in a usual manner.

It is apparent that by adjusting the frame 8 and positioning the same at an angle with relation to a horizontal that the device may be adapted for separating seed of different specific gravity and by adjusting the shaft 16 in the frame 8 the upper run of the belt 15 may be caused to assume an anticlinal posture which will render the separation of the seed of different characters more accurate and positive.

Having thus described my invention what I claim is:—

1. A separator comprising a frame adjustable to different positions relative to the horizontal, a belt mounted for movement along the frame, means for moving the belt, a crank shaft journaled upon the frame at a point between the ends of the belt and having its crank disposed between the upper and lower runs of the belt, means for securing the crank shaft at an adjusted position, and a roller journaled upon the crank of the shaft and engageable with the under surface of the upper run of the belt and adapted to dispose the opposite end portions of the upper run of the belt at an angle with relation to each other.

2. A separator having an endless flexible belt to engage material to be separated, means to drive the belt, and movable means associated with the belt for projection to dispose portions of a run of the belt at an angle to each other.

3. A separator having an endless flexible belt to engage the material to be separated, means to drive the belt, and means normally inactive operable for projection against said belt intermediate the ends of a run thereof to provide portions of said run at an angle to each other.

4. A separator having a belt, means to drive the belt, a frame for the belt, means movably mounted on the frame operable for projection against a run of the belt to dispose portions of the belt at an angle to each other, the last mentioned means being disposed intermediate the run of the belt and normally out of operative relation with the belt.

In testimony whereof I affix my signature in presence of two witnesses.

FERDINAND W. BUSCH.

Witnesses:
W. D. LYNCH,
JULIA P. ANDERSON.